United States Patent
Koizumi

(10) Patent No.: US 12,044,582 B2
(45) Date of Patent: Jul. 23, 2024

(54) OPTICAL FIBER STRAIN AND TEMPERATURE MEASUREMENT APPARATUS AND OPTICAL FIBER STRAIN AND TEMPERATURE MEASUREMENT METHOD

(71) Applicant: Oki Electric Industry Co., Ltd., Tokyo (JP)

(72) Inventor: Kengo Koizumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 238 days.

(21) Appl. No.: 17/747,066

(22) Filed: May 18, 2022

(65) Prior Publication Data

US 2022/0404215 A1  Dec. 22, 2022

(30) Foreign Application Priority Data

Jun. 17, 2021 (JP) .................. 2021-101108

(51) Int. Cl.
*G01K 11/322* (2021.01)
*G01L 1/24* (2006.01)

(52) U.S. Cl.
CPC ............ *G01K 11/322* (2021.01); *G01L 1/242* (2013.01)

(58) Field of Classification Search
CPC .............................. G01K 11/322; G01L 1/242
See application file for complete search history.

(56) References Cited

U.S. PATENT DOCUMENTS

2016/0290857 A1  10/2016  Koizumi
2018/0094987 A1*  4/2018  Iwamura ................ G01K 11/32

FOREIGN PATENT DOCUMENTS

JP  2016-191659 A  11/2016
JP  2020-051941 A  4/2020

OTHER PUBLICATIONS

T. Kurashima et al., "Brillouin Optical-Fiber Time Domain Reflectometry", IEICE Trans. Commun., vol. E76-B, No. 4, pp. 382-390, Apr. 1993.

* cited by examiner

*Primary Examiner* — Hina F Ayub
(74) *Attorney, Agent, or Firm* — Rabin & Berdo, P.C.

(57) ABSTRACT

To expand a measurement range with regard to SDH-BOTDR.
A BFS1 and a BFS2, which is obtained by inverting the BFS1, are acquired on the basis of a first measurement signal and a first local oscillation signal that is a cosine wave, a BFS3 is acquired on the basis of a second measurement signal and a second local oscillation signal that is a sine wave, and a Brillouin frequency shift waveform is synthesized from the BFS1 to BFS3. In the case where an optical fiber is not strained or in the case where temperature of the optical fiber is not changed, a phase rotation number N, which is a phase difference between a measurement signal and a local oscillation signal, is calculated on the basis of intensity of the measurement signal, and an offset corresponding to the phase rotation number N is given to the synthesized Brillouin frequency shift waveform.

9 Claims, 12 Drawing Sheets

OPTICAL FIBER STRAIN AND TEMPERATURE MEASUREMENT APPARATUS AND OPTICAL FIBER STRAIN AND TEMPERATURE MEASUREMENT METHOD

CROSS REFERENCE TO RELATED APPLICATION(S)

This application is based upon and claims benefit of priority from Japanese Patent Application No. 2021-101108, filed on Jun. 17, 2021, the entire contents of which are incorporated herein by reference.

BACKGROUND

The present invention relates to an optical fiber strain and temperature measurement apparatus and an optical fiber strain and temperature measurement method using Brillouin scattered light.

With the evolution of optical fiber communication, distributed optical fiber sensing, in which the optical fiber itself serves as a sensing medium, has become an active area of research. In particular, different from an electric sensor that performs measurement for each point, optical fiber sensing that uses scattered light is capable of sensing as long-distance distribution. Accordingly, the optical fiber sensing allows the physical quantity of the entire measurement target to be measured.

Representative distributed optical fiber sensing is optical time domain reflectometry (OTDR), in which optical pulses are incident on an optical fiber from one end of the optical fiber, and light backscattered within the optical fiber is measured with respect to time. Backscattering in an optical fiber includes Rayleigh scattering, Brillouin scattering, and Raman scattering. Among others, OTDR that measures spontaneous Brillouin scattering is referred to as Brillouin OTDR (BOTDR) (see, for example, T. Kurashima et al., "Brillouin Optical-fiber time domain reflectometry", IEICE Trans. Commun., vol. E76-B, no. 4, pp. 382-390 (1993)).

Brillouin scattering is observed at positions with the frequency shift of the order of GHz on Stokes and anti-Stokes sides with respect to the center frequency of the optical pulse incident on the optical fiber. The spectrum of Brillouin scattering is referred to as the Brillouin gain spectrum (BGS). The frequency shift and the spectral line width of the BGS are referred to as Brillouin frequency shift (BFS) and Brillouin line width, respectively. The BFS and the Brillouin line width vary depending on the material of the optical fiber and the wavelength of incident light. For example, in the case of a silica-based single-mode optical fiber, it is reported that the magnitude of the BFS and the Brillouin line width for a wavelength of 1.55 µm are approximately 11 GHz and approximately 30 MHz, respectively. In addition, according to T. Kurashima et al., "Brillouin Optical-fiber time domain reflectometry", IEICE Trans. Commun., vol. E76-B, no. 4, pp. 382-390 (1993), the magnitudes of the BFS associated with strain and a temperature change inside a single-mode fiber are 0.049 MHz/µε and 1.0 MHz/° C., respectively, for a wavelength of 1.55 µm.

Here, the BFS has dependency on strain and temperature. Therefore, BOTDR has been attracting attention because BOTDR is usable for the purpose of diagnosing deterioration of large constructions represented by bridges, tunnels and the like, monitoring temperature of plants, monitoring potential areas of landslide occurrence, or the like.

BOTDR generally performs heterodyne detection to measure the spectrum waveform of spontaneous Brillouin scattered light caused in an optical fiber with the use of reference light prepared separately. The intensity of spontaneous Brillouin scattered light is lower than the intensity of Rayleigh scattered light by two through three orders of magnitude. Therefore, heterodyne detection is also useful in increasing the minimum light reception sensitivity.

Here, even the application of heterodyne detection does not offer a sufficient signal-to-noise ratio (S/N) as spontaneous Brillouin scattered light is very weak. As a result, an averaging process is necessary to improve S/N. A conventional optical fiber strain measurement apparatus that performs BOTDR acquires three-dimensional information of time, amplitude, and frequency. The averaging process and the acquisition of this three-dimensional information, however, make it difficult to shorten measurement time.

For this, the inventors of the present application have proposed an optical fiber strain measurement apparatus and an optical fiber strain measurement method that use self-delayed heterodyne BOTDR (SDH-BOTDR) (see, for example, JP 2016-191659A). The SDH-BOTDR compares phases between a received beat signal and a local oscillation signal, and observes change in BFS as phase variation in the beat signal. As described above, the SDH-BOTDR is capable of directly calculating the BFS without frequency sweep. This makes it possible to achieve fast and inexpensive measurement.

SUMMARY

As described above, the SDH-BOTDR described in JP 2016-191659A observes phase variation. However, its measurement range is limited to a range of 0 to π though a range of the phase variation is 0 to 2π. Therefore, a result of the measurement is inverted in the case of π to 2π.

For this, there have been proposed technologies of expanding the measurement range to the range of 0 to 2π by using not only a cosine (cos) wave but also a sine (sin) wave as a local oscillation signal for extracting the phase variation (see, for example, JP 2020-051941A). However, it is desired to further expand the measurement range because the measurement range is expanded to the range of 0 to 2π.

The present invention is made in view of the aforementioned issue. An object of the present invention is to provide an optical fiber strain and temperature measurement apparatus and an optical fiber strain and temperature measurement method that expand a measurement range with regard to SDH-BOTDR.

To achieve the above object, an optical fiber strain and temperature measurement apparatus according the present invention includes a light source unit configured to generate probe light, a splitting unit configured to split Brillouin backscattered light generated from the probe light through an optical fiber serving as a measurement target, into two branches including a first light path and a second light path, an optical frequency shifter unit provided in any one of the first light path and the second light path and configured to give a frequency shift of a beat frequency, a delay unit provided in any one of the first light path and the second light path and configured to delay propagating light by delay time τ, a multiplexer unit configured to multiplex light propagating through the first light path and the second light path to generate multiplexed light, a coherent detection unit configured to perform heterodyne detection on the multiplexed light to output a difference frequency as a measurement signal, an electrical signal generating unit configured to generate a local oscillation signal having a same frequency as a frequency of the measurement signal and a Brillouin frequency shift acquisition unit configured to perform homodyne detection on the measurement signal and the local oscillation signal to acquire a phase difference between the measurement signal and the local oscillation signal and a frequency shift amount based on intensity of the measurement signal.

The Brillouin frequency shift acquisition unit includes a first Brillouin frequency shift calculation unit, a second Brillouin frequency shift calculation unit, a synthesizer unit, a 90-degree phase shift unit, and a finiteness elimination unit, the measurement signal transmitted to the Brillouin frequency shift acquisition unit is split into two branches, one of split measurement signals is referred to as a first measurement signal and is transmitted to the first Brillouin frequency shift calculation unit, the other of the split measurement signals is referred to as a second measurement signal and is transmitted to the second Brillouin frequency shift calculation unit, the local oscillation signal transmitted to the Brillouin frequency shift acquisition unit is split into two branches, one of split local oscillation signals is referred to as a first local oscillation signal and is transmitted to the first Brillouin frequency shift calculation unit, the other of the split local oscillation signals is referred to as a second local oscillation signal, is subjected to 90-degree phase shift in the 90-degree phase shift unit, and then is transmitted to the second Brillouin frequency shift calculation unit.

The first Brillouin frequency shift calculation unit acquires a first Brillouin frequency shift BFS1 and a second Brillouin frequency shift BFS2, which is obtained by inverting the first Brillouin frequency shift, on a basis of the first measurement signal and the first local oscillation signal. The second Brillouin frequency shift calculation unit acquires a third Brillouin frequency shift BFS3 on a basis of the second measurement signal and the second local oscillation signal.

The synthesizer unit synthesizes a Brillouin frequency shift waveform from the first to third Brillouin frequency shifts BFS1 to BFS3 and in a case where the optical fiber is not strained or in a case where temperature of the optical fiber is not changed, the finiteness elimination unit calculates a phase rotation number N, which is a phase difference between the measurement signal and the local oscillation signal, on a basis of the intensity of the measurement signal, and gives an offset corresponding to the phase rotation number N to the synthesized Brillouin frequency shift waveform.

An optical fiber strain and temperature measurement method according the present invention includes a step of generating probe light, a step of splitting Brillouin backscattered light generated from the probe light through an optical fiber serving as a measurement target, into two branches including a first light path and a second light path, a step of giving a frequency shift of a beat frequency to light propagating through any one of the first light path and the second light path, a step of delaying light propagating through any one of the first light path and the second light path, by delay time τ, a step of multiplexing light propagating through the first light path and the second light path to generate multiplexed light, a step of performing heterodyne detection on the multiplexed light to output a difference frequency as a measurement signal, a step of generating a local oscillation signal having a same frequency as a frequency of the measurement signal and a step of performing homodyne detection on the measurement signal and the local oscillation signal to acquire a frequency shift amount. The step of acquiring of the frequency shift amount includes a step of splitting the measurement signal into two signals including a first measurement signal and a second measurement signal, a step of splitting the local oscillation signal into two signals including a first local oscillation signal and a second local oscillation signal, a step of acquiring a first Brillouin frequency shift BFS1 and a second Brillouin frequency shift BFS2, which is obtained by inverting the first Brillouin frequency shift, on a basis of the first measurement signal and the first local oscillation signal, a step of acquiring a third Brillouin frequency shift BFS3 on a basis of the second measurement signal and the second local oscillation signal after subjecting the second local oscillation signal to 90-degree phase shift, a step of synthesizing a Brillouin frequency shift waveform from the first to third Brillouin frequency shifts BFS1 to BFS3 and a step of calculating a phase rotation number N, which is a phase difference between the measurement signal and the local oscillation signal, on a basis of intensity of the measurement signal and giving an offset corresponding to the phase rotation number N to the synthesized Brillouin frequency shift waveform in a case where the optical fiber is not strained or in a case where temperature of the optical fiber is not changed.

The optical fiber strain and temperature measurement apparatus and the optical fiber strain and temperature measurement method according to the present invention make it possible to expand a measurement range in comparison to conventional technologies.

DETAILED DESCRIPTION OF THE EMBODIMENT(S)

With reference to the drawings, the following describes embodiments of the present invention, but each diagram is merely illustrated so schematically that the present invention can be understood. In addition, the following describes a preferable configuration example of the present invention, but it is a mere preferable example. Thus, the present invention is not limited to the following embodiments. A large number of changes or modifications that can attain the advantageous effects of the present invention can be made without departing from the configuration scope of the present invention. It should be noted that, in this specification and the appended drawings, structural elements that have substantially the same function and structure are denoted with the same reference signs, and repeated explanation thereof is omitted.

DESCRIPTION OF PRINCIPLE

Figure 1:
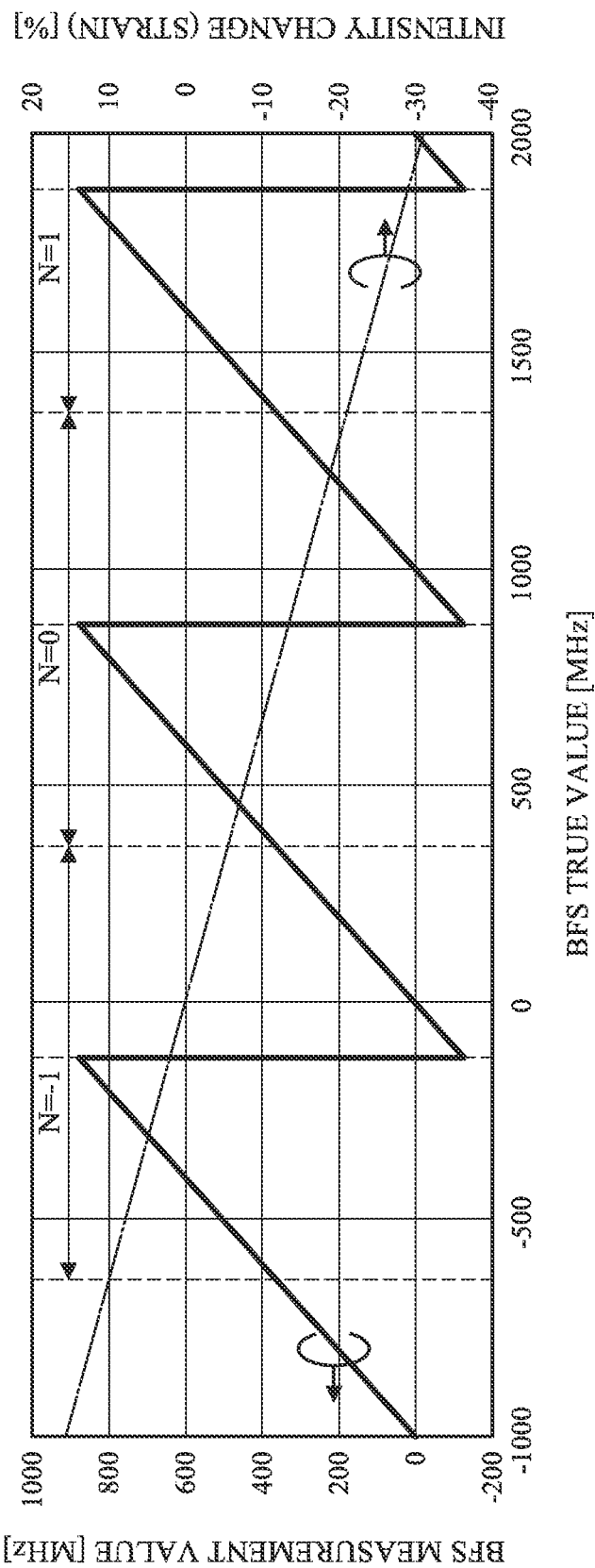
FIG. 1 is a schematic diagram illustrating a principle of the present invention.

First, with reference to FIG. 1, a principle of an optical fiber strain and temperature measurement apparatus and an optical fiber strain and temperature measurement method that use SDH-BOTDR according to the present invention will be described. FIG. 1 is a schematic diagram for describing the principle of the present invention. FIG. 1 illustrates a horizontal axis representing BFS true values [MHz] that are values of caused BFS, a left axis representing BFS measurement values [MHz] that are values of BFS acquired by the synthesizer unit (to be described later), and a right axis representing intensity change [%] of measurement signals. Here, a case where an optical fiber has a constant temperature and intensity of a measurement signal varies depending on strain on the optical fiber is exemplified.

According to the optical fiber strain and temperature measurement apparatus and the optical fiber strain and temperature measurement method that use SDH-BOTDR, a phase of a received beat signal and a phase of a local oscillation signal are compared and BFS is calculated on the basis of observed phase variation in the beat signal. Therefore, the BFS rotates every $2\pi$ phase variation. Accordingly, in the case of SDH-BOTDR, its measurement range is limited to a range of 0 to $2\pi$ in principle.

It is reported that the frequency shift and the scattering coefficient both have temperature and strain dependency in Brillouin backscatter. Relations represented by expressions (1a) and (1b) listed below hold when the coefficient of strain dependence and the coefficient of temperature dependence of the BFS are $C_{v\varepsilon}$ [MHz/µε] and $C_{VT}$ [MHz/° C.], respectively, and the coefficient of strain dependence and the coefficient of temperature dependence of the Brillouin scattering coefficient are $C_{P\varepsilon}$ [%/µε] and $C_{PT}$ [%/° C.], respectively.

$$BFS = C_{v\varepsilon}\delta\varepsilon + C_{VT}\delta T \quad (1a)$$

$$P_{change} = 100\frac{\delta P_B}{P_B} = C_{P\varepsilon}\delta\varepsilon + C_{PT}\delta T \quad (1b)$$

In the expressions, $\delta P_B/P_B$ is relative change (intensity change) $P_{change}$ [%] in Brillouin scattering intensity. BFS and $P_{change}$ are values that can be measured in SDH-BOTDR. In addition, $\delta\varepsilon$ and $\delta T$ are amounts of change in strain and temperature, respectively.

With regard to the above-listed expressions (1a) and (1b), $P_{change}=(C_{PT}C_{vT})\times BFS$ is obtained in the case where the optical fiber is not strained, and $P_{change}=(C_{P\varepsilon}/C_{v\varepsilon})\times BFS$ is obtained in the case where the temperature is not changed. Accordingly, the intensity change $P_{change}$ linearly varies with respect to the BFS in the case where any one of the strain and temperature is constant.

Therefore, it is possible to eliminate finiteness of the measurement range of 0 to $2\pi$ and expand the measurement range to more than the range of 0 to $2\pi$ by using $P_{change}$, acquiring a phase rotation number of BFS, and calculating BFS on the basis of the phase rotation number.

Description of Configuration

Figure 2:
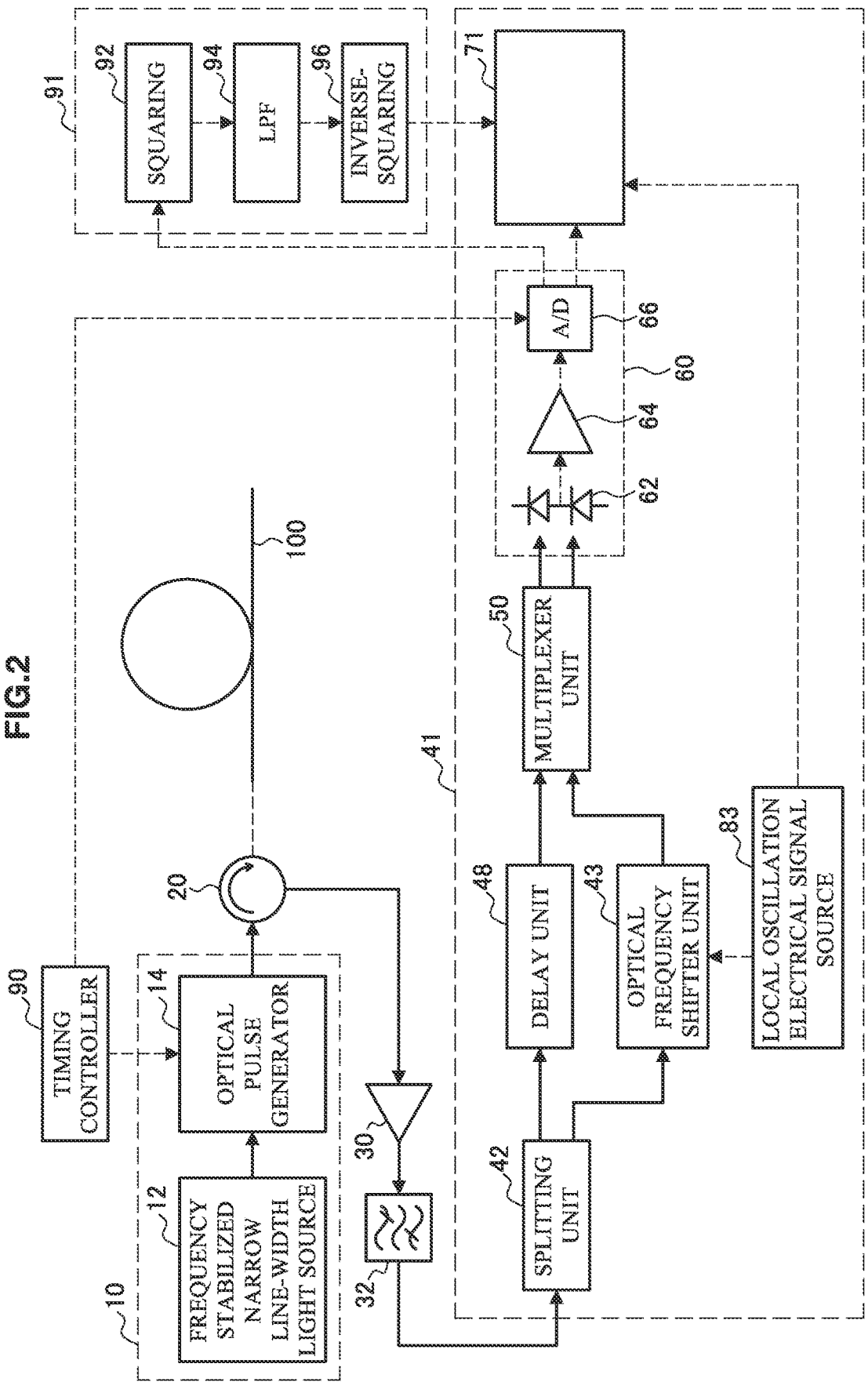
FIG. 2 is a block diagram schematically illustrating a configuration example of a measurement apparatus.
Figure 3:
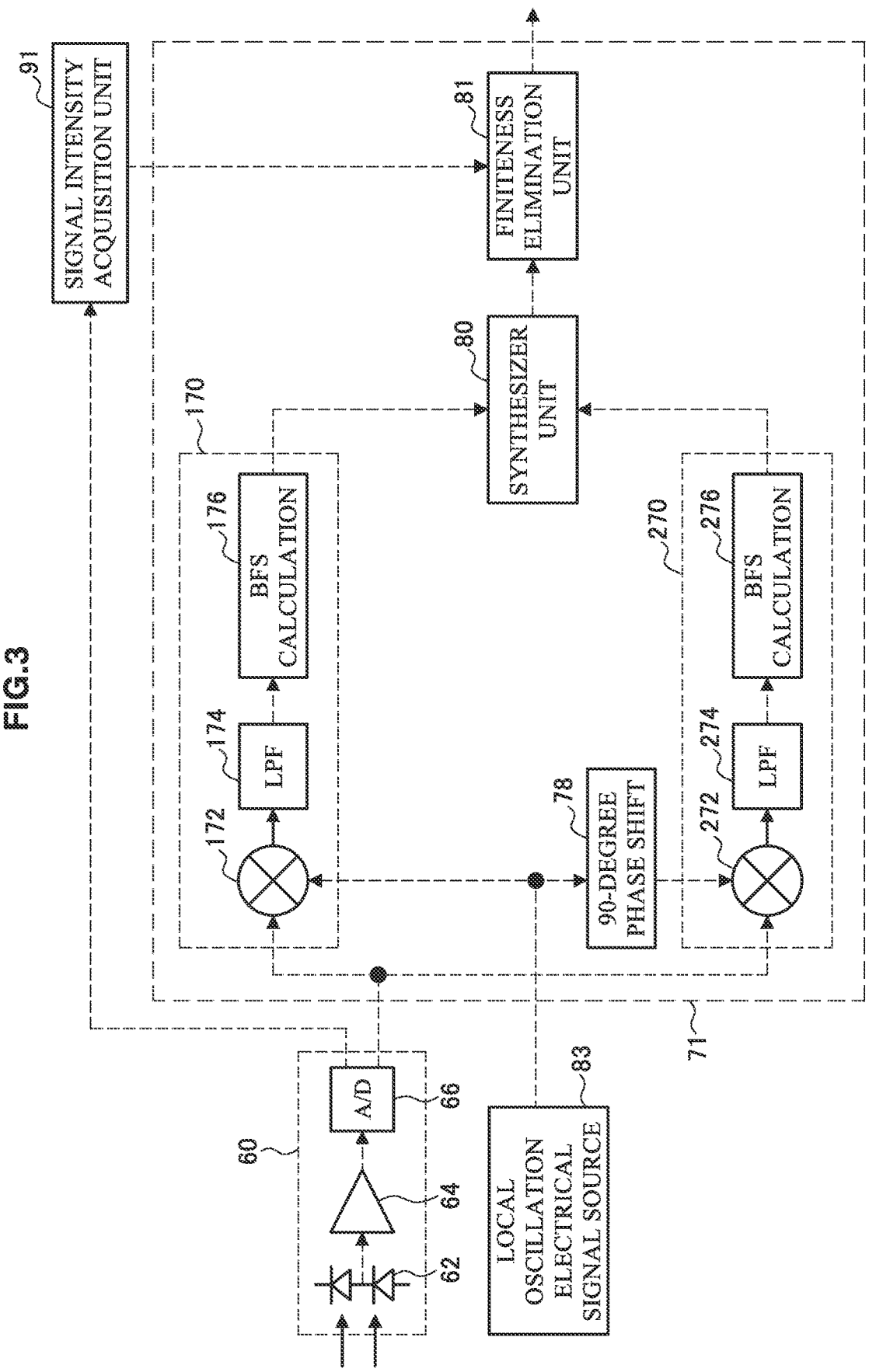
FIG. 3 is a block diagram schematically illustrating a BFS acquisition unit of the measurement apparatus.

The optical fiber strain and temperature measurement apparatus according to the present embodiment will be described with reference to FIG. 2 and FIG. 3. FIG. 2 is a block diagram schematically illustrating a configuration example of the optical fiber strain and temperature measurement apparatus (hereinafter, also simply referred to as a measurement apparatus) according to the present embodiment. FIG. 3 is a block diagram schematically illustrating a BFS acquisition unit of the measurement apparatus.

The measurement apparatus includes a light source unit 10, a circulator 20, an optical amplifier 30, an optical bandpass filter 32, a self-delayed heterodyne interferometer 41, a signal intensity acquisition unit 91, and a timing controller 90.

The light source unit 10 generates probe light. The light source unit 10 includes a light source 12 configured to generate continuous light and an optical pulse generator 14 configured to generate optical pulses from the continuous light.

Here, the measurement apparatus measures a phase difference corresponding to a frequency change. Therefore, frequency fluctuations and frequency spectral line width (hereinafter, also simply referred to as line width) of the light source 12 need to be sufficiently smaller than a Brillouin frequency shift. Thus, a frequency stabilized narrow linewidth light source is used as the light source 12. For example, when an optical fiber 100 serving as a measurement target (hereinafter, also referred to as a measurement target optical fiber) has a strain of 0.008%, the corresponding Brillouin frequency shift is 4 MHz. Therefore, to measure a strain of approximately 0.008%, it is preferable that the frequency fluctuation and the line width of the light source 12 is sufficiently smaller than 4 MHz, and equal to or less than several tens of kHz. Note that, narrow line width lasers that have frequency fluctuation and line width equal to or less than approximately ten kHz are commercially available as ready-made product.

The optical pulse generator 14 is implemented as any suitable conventionally well-known acousto-optical (AO) modulator or electrooptical (EO) modulator. The optical pulse generator 14 generates optical pulses from continuous light in response to electrical pulses generated by the timing controller 90. The repetition period of the optical pulses is set longer than the round trip time for an optical pulse along the measurement target optical fiber 100. The optical pulses are output as the probe light from the light source unit 10.

The probe light output from the light source unit 10 enters the measurement target optical fiber 100 via the circulator 20. Note that an optical coupler may be used instead of the circulator 20.

Backscattered light from the measurement target optical fiber 100 is transmitted to the optical amplifier 30 which is implemented as, for example, an erbium-doped optical fiber amplifier (EDFA) or the like via the circulator 20. The backscattered light amplified by the optical amplifier 30 is transmitted to the optical bandpass filter 32. The optical bandpass filter 32 has a passband of approximately 10 GHz and passes only spontaneous Brillouin scattered light. The spontaneous Brillouin scattered light is transmitted to the self-delayed heterodyne interferometer 41. An expression (2) listed below represents a signal $E_0(t)$, at time t, of the spontaneous Brillouin scattered light emitted from the optical bandpass filter 32.

$$E_0(t)=A_0\eta_B(t)\exp\{j(2\pi f_B(t)t+\varphi_0)\} \quad (2)$$

In the expression, $A_0$ is amplitude, $\eta_B(t)$ is a Brillouin scattering coefficient, $f_B(t)$ is an optical frequency of the Brillouin scattered light, and $\varphi_0$ is an initial phase. Note that the Brillouin scattering coefficient $\eta_B(t)$ and the optical frequency $f_B(t)$ of the Brillouin scattered light vary depending on local oscillation strain and temperature change in the optical fiber and thus are expressed as a function of time t.

The self-delayed heterodyne interferometer 41 includes a splitting unit 42, an optical frequency shifter unit 43, a delay unit 48, a multiplexer unit 50, a coherent detection unit 60, a local oscillation electrical signal source 83 serving as an electrical signal generating unit, and a BFS acquisition unit 71.

The local oscillation electrical signal source 83 generates an electrical signal having a frequency $f_{AOM}$.

The splitting unit 42 receives, via the optical bandpass filter 32, and splits Brillouin backscattered light generated from the probe light through the measurement target optical fiber 100, into two branches including a first light path and a second light path.

The optical frequency shifter unit 43 is provided in any one of the first light path and the second light path. In this configuration example, the optical frequency shifter unit 43 is provided in the first light path. The optical frequency shifter unit 43 subjects light propagating through the first light path to frequency shift of the frequency $f_{AOM}$, by using the electrical signal that has the frequency $f_{AOM}$ and that is generated by the local oscillation electrical signal source 83.

In addition, the delay unit 48 is provided in any one of the first light path and the second light path. In this configuration example, the delay unit 48 is provided in the second light path. The delay unit 48 delays light propagating through the second light path, by delay time $\tau$.

The multiplexer unit 50 multiplexes the light propagating through the first light path and the light propagating through the second light path to generate multiplexed light. An expression (3a) and an expression (3b) listed below respectively represent an optical signal $E_1(t)$ propagating through the first light path and an optical signal $E_2(t-\tau)$ propagating through the second light path that are incident on the multiplexer unit 50.

$$E_1(t)=A_1\eta_B(t)\exp\{j((2\pi f_B(t)t+2\pi f_{AOM}t+\varphi_1)\} \quad (3a)$$

$$E_2(t-\tau)=A_2\eta_B(t)\exp[j\{2\pi f_B(t)(t-\tau)+\varphi_2\}] \quad (3b)$$

In the expressions, $A_1$ and $A_2$ are the amplitudes of E1(t) and E2(t−τ), respectively, and $\varphi_1$ and $\varphi_2$ are initial phases of E1(t) and E2(t−τ), respectively.

The coherent detection unit 60 performs heterodyne detection on the multiplexed light to generate a beat signal. The coherent detection unit 60 includes, for example, a balanced photodiode (PD) 62, an FET amplifier 64, and an analog-to-digital converter (A/D) 66. An expression (4) listed below represents a beat signal $I_{12}$ obtained through the heterodyne detection. The frequency $f_{AOM}$ of the beat signal $I_{12}$ is also referred to as beat frequency.

$$I_{12}=2A_1A_2\eta_B^2(t)\cos\{2\pi(f_{AOM}t+f_B(t)\tau)+\varphi_1-\varphi_2\} \quad (4)$$

The beat signal $I_{12}$ generated by the coherent detection unit 60 is split into two branches. One of the split pieces of the beat signal $I_{12}$ is transmitted to the BFS acquisition unit 71 as a measurement signal. In addition, an electrical signal generated by the local oscillation electrical signal source 83 is transmitted to the BFS acquisition unit 71 as a local oscillation signal. On the other hand, the other of the split pieces of the beat signal $I_{12}$ is transmitted to the signal intensity acquisition unit 91.

The BFS acquisition unit 71 includes a first Brillouin frequency shift (BFS) calculation unit 170, a second Brillouin frequency shift (BFS) calculation unit 270, a synthesizer unit 80, a finiteness elimination unit 81, and a 90-degree phase shift unit 78. For example, the BFS acquisition unit 71 may be implemented as a commercially available personal computer equipped with software for executing processes to be described below. Alternatively, the BFS acquisition unit 71 may be implemented as a field-programmable gate array (FPGA). Note that, the BFS acquisition unit 71 is provided with any suitable storage unit (not illustrated), and appropriately stores a measurement result and the like.

Note that, the beat signal represented by the above-listed expression (4) is very faint. Therefore, it is necessary to perform an averaging process to improve a signal-to-noise ratio (S/N). The averaging process is desirably performed by the FPGA for the sake of speeding up.

The measurement signal transmitted to the BFS acquisition unit 71 is split into two branches. A first measurement signal, which is one of the split pieces of the measurement signal, is transmitted to a first BFS calculation unit 170. A second measurement signal, which is the other of the split pieces of the measurement signal, is transmitted to a second BFS calculation unit 270.

In addition, the local oscillation signal transmitted to the BFS acquisition unit 71 is split into two branches. A first local oscillation signal, which is one of the split pieces of the local oscillation signal, is transmitted to the first BFS calculation unit 170. A second local oscillation signal, which is the other of the split pieces of the local oscillation signal, is subjected to 90-degree phase shift in the 90-degree phase shift unit 78, and is transmitted to the second BFS calculation unit 270. In the case where the local oscillation signal is a cosine wave (cos wave), the first local oscillation signal is transmitted to the first BFS calculation unit 170 as a cos wave, and the second local oscillation signal is transmitted to the second BFS calculation unit 270 as a sine wave (sin wave).

The first BFS calculation unit 170 includes a first mixer 172, a first LPF 174, and a first BFS calculation unit 176. In a similar way, the second BFS calculation unit 270 includes a second mixer 272, a second LPF 274, and a second BFS calculation unit 276.

First, the first BFS calculation unit 170 will be described. The first mixer 172 performs homodyne detection on the first measurement signal and the first local oscillation signal, and generates a homodyne signal. An expression (5) listed below represents a local oscillation signal $I_{cos}$ generated by the local oscillation electrical signal source 83.

$$I_{cos}=A_{cos}\cos(2\pi f_{AOM}t+\varphi_{cos}) \quad (5)$$

The homodyne signal generated by the first mixer 172 is represented by an expression (6), which is obtained by multiplying the above-listed expression (4) by the above-listed expression (5).

$$I_{12}\times I_{cos}=A_1A_2A_{cos}\eta_B^2(t)\cos\{2\pi(2f_{AOM}t+f_B(t)\tau)+\varphi_{offset}\}+A_1A_2A_{cos}\eta_B^2(t)\cos(2\pi f_B(t)\tau+\varphi_{offset}) \quad (6)$$

In the expression, $\varphi_{offset}=\varphi_1-\varphi_2-\varphi_{cos}$ is satisfied, and this represents a phrase difference between a beat signal and a local oscillation signal. A signal represented by an expression (7) listed below is obtained when the first LPF 174 eliminates a sum frequency component, that is, a first term in the expression (6).

$$I_{12} \lambda I_{cos} = A_1 A_2 A_{cos} \eta_B^2(t) \cos(2\pi f_B(t)\tau + \emptyset_{offset}) \quad (7)$$

As represented by the expression (7), change in the Brillouin frequency $f_B(t)$ and change in the Brillouin scattering coefficient $\eta B(t)$ become functions of time. Therefore, these changes are output as change in output intensity. Here, the change in the Brillouin frequency $f_B(t)$ is an observation target component. Therefore, the change in the Brillouin scattering coefficient $\eta B(t)$ is eliminated. The Brillouin scattering coefficient $\eta B(t)$ can be eliminated from information about intensity change obtained by performing envelope detection on the above-listed expression (4). Therefore, the above-listed expression (7) can be rewritten as an expression (8) listed below.

$$I_{12} \times I_{cos} = A_1 A_2 A_{cos} \cos(2\pi f_B(t)\tau + \emptyset_{offset}) \quad (8)$$

By using the above-listed expression (8), it is possible to output only the change in the Brillouin frequency $f_B(t)$ as the intensity change. The first BFS calculation unit 176 calculates a first Brillouin frequency shift BFS1 from an amplitude value of the above-listed expression (8). Note that, the BFS1 is also referred to as $BFS_{cos}$ because the BFS1 is obtained by using a cos wave. In addition, the first BFS calculation unit 176 calculates $BFS_{cos\_inverse}$ as a second Brillouin frequency shift BFS2. The $BFS_{cos\_inverse}$ is obtained by inverting the $BFS_{cos}$.

In the above-listed expression (8), the phase shift $2\pi f_B(t)\tau$ is converted into the amplitude value. Therefore, normalization is performed as represented by an expression (9) listed below, for ease of conversion into the BFS1.

$$I_{a.u.cos} = \frac{1}{2} + \frac{1}{2} \cos(2\pi f_B(t)\tau + \emptyset_{offset}) \quad (9)$$

On the basis of the above-listed expression (9), the BFS1 is calculated by using an expression (10) listed below.

$$BFS_{cos} = f_B(t) = \frac{a \cos(2I_{a.u.\_cos} - 1) - \emptyset_{offset}}{2\pi\tau} \quad (10)$$

A relation between the BFS1 and the intensity $I_{a.u.cos}$ normalized as represented by the above-listed expression (9) will be described.

A frequency range of BFS is decided by the delay time $\tau$ and is given by $1/\tau$. For example, it is assumed that the delay time $\tau$ is 1n seconds, the frequency range of BFS is calculated to be 0 to 500 MHz in phases 0 to $\pi$. In addition, $\varphi_{offset}(=2\pi BFS_{offset})$ represents an initial value of the phase. The measurement range is set to a range of $-BFS_{offset}$ to $\frac{1}{2}\tau - BFS_{offset}$ while using the set $BFS_{offset}$ as a criterion of 0 MHz. The settings for $BFS_{offset}$ is configured as described above. This makes it possible to measure phase variation in a negative direction from a criterion phase.

Figure 4:
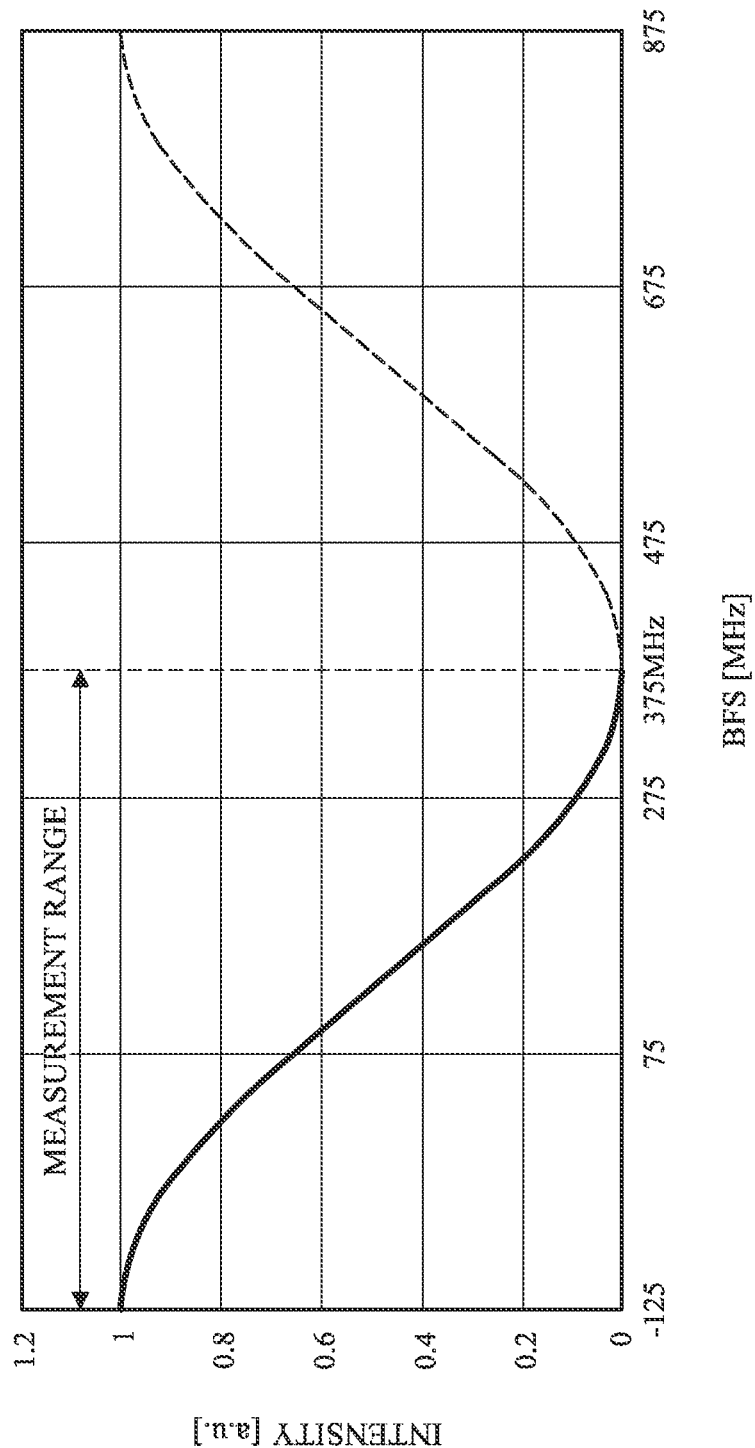
FIG. 4 is a diagram illustrating a relation between normalized intensity and $BFS_{cos}$.

FIG. 4 is a diagram illustrating a relation between the normalized intensity and the $BFS_{cos}$, which is represented by the above-listed expression (10). FIG. 4 illustrates a horizontal axis representing BFS [MHz], and a vertical axis representing intensities [a.u.]. Here, an example in which the delay time $\tau$ is 1n seconds and the $BFS_{offset}$ is 125 MHz will be described. In this case, a frequency measurement range is set to a range of $-125$ MHz to 375 MHz. The intensity of the BFS1 is inverted when the BFS1 exceeds 375 MHz, which is a limit of the frequency measurement range. As a result, even when an actual BFS value is 400 MHz, a measured BFS1 is calculated to be 350 MHz.

Next, the second BFS calculation unit 270 will be described. The second mixer 272 performs homodyne detection on the second measurement signal and the second local oscillation signal, and generates a homodyne signal. The second local oscillation signal is a sin wave obtained by subjecting the local oscillation signal $I_{cos}$ to the 90-degree phase shift, the local oscillation signal $I_{cos}$ being a cos wave generated by the local oscillation electrical signal source 83. The second local oscillation signal is represented by an expression (11) listed below.

$$I_{sin} = A_{cos} \sin(2\pi f_{AOM} t + \emptyset_{cos}) \quad (11)$$

The second mixer 272 and the second LPF 274 operate in ways similar to the first mixer 172 and the first LPF 174 except that the second local oscillation signal is the sin wave while the first local oscillation signal is the cos wave. Therefore, details thereof will be omitted. An expression (12) listed below is obtained when the above-listed expressions (6) to (10) are rewritten by using the above-listed expression (11) instead of the expression (5).

$$BFS_{sin} = f_B(t) = \frac{a \sin(2I_{a.u.\_sin} - 1) - \emptyset_{offset}}{2\pi\tau} \quad (12)$$

The second BFS calculation unit 276 calculates a second Brillouin frequency shift BFS3. Note that, the BFS3 is also referred to as $BFS_{sin}$ because the BFS3 is obtained by using a sin wave.

Figure 5:
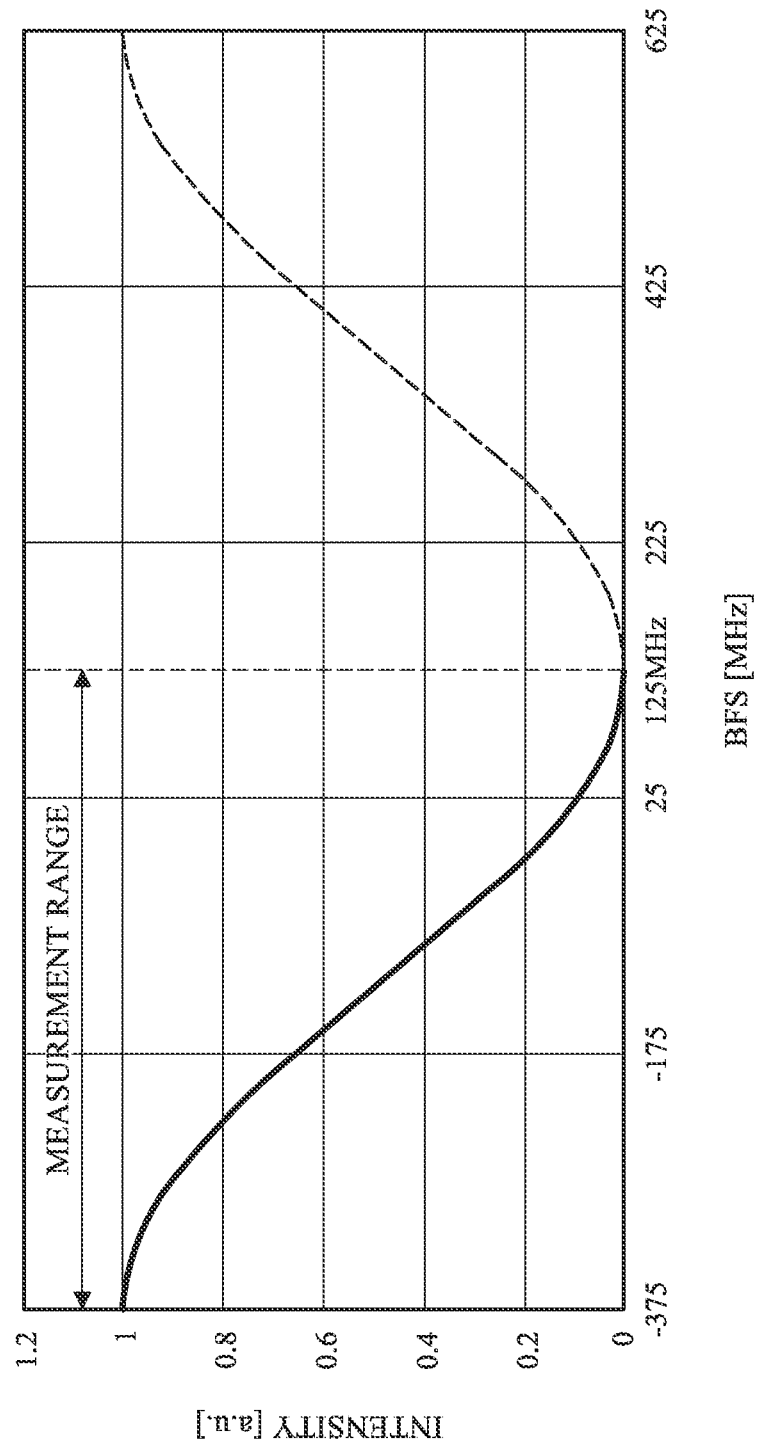
FIG. 5 is a diagram illustrating a relation between normalized intensity and $BFS_{sin}$.

FIG. 5 is a diagram illustrating a relation between the normalized intensity and the $BFS_{sin}$, which is represented by the above-listed expression (11). FIG. 5 illustrates a horizontal axis representing BFS [MHz], and a vertical axis representing intensities [a.u.]. In a way similar to the $BFS_{cos}$ described above, delay time $\tau$ is 1n seconds, and $BFS_{offset}$ is 125 MHz. In this case, a frequency measurement range is set to a range of $-375$ MHz to 125 MHz. The intensity of the $BFS_{cos}$ is inverted when the $BFS_{cos}$ exceeds 125 MHz, which is a limit of the frequency measurement range.

Figure 6:
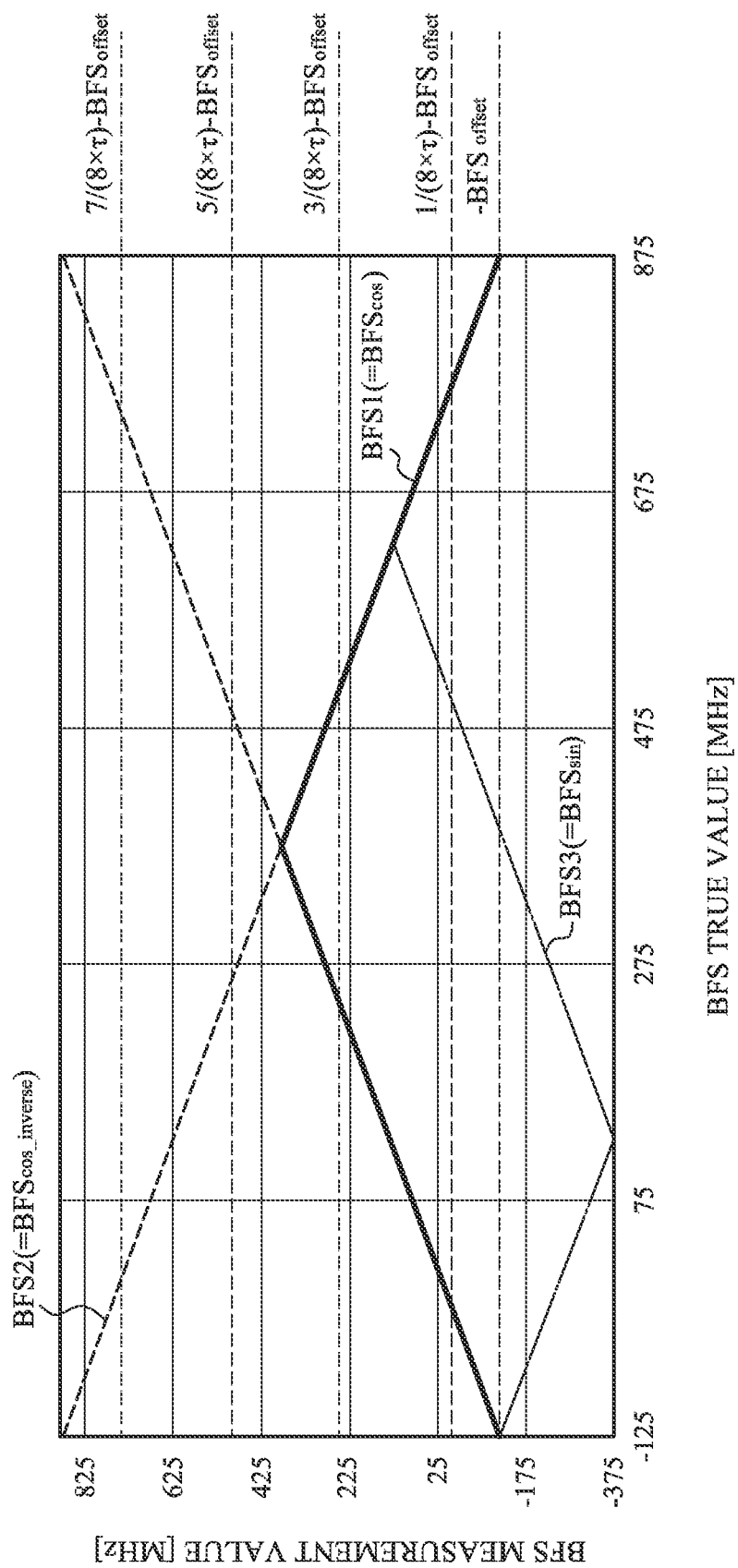
FIG. 6 is a diagram (part 1) illustrating a relation between BFS true values and BFS measurement values.

FIG. 6 illustrates BFS1(=$BFS_{cos}$), BFS2(=$BFS_{cos\_inverse}$), and BFS3(=$BFS_{sin}$) calculated by the above-listed expressions (10) and (12).

FIG. 6 illustrates a horizontal axis representing actual BFS values (BFS true values) [MHz], and a vertical axis representing measured BFS values (BFS measurement values) [MHz].

In the case of the BFS1 and the BFS2, a value at which the BFS measurement value is inverted is 375 MHz. In the case of the BFS3, a value at which the BFS measurement value is inverted is 125 MHz and 625 MHz.

The synthesizer unit 80 synthesizes a Brillouin frequency shift waveform by using the BFS1, BFS2, and BFS3 that are calculated by the first BFS calculation unit 170 and the second BFS calculation unit 270.

Here, there is a concern that the linearity becomes a problem in a region near a point at which a BFS measurement value is inverted if any of the BFS1, BFS2, and BFS3 is selected on the basis of the point at which its BFS measurement value is inverted.

In the case where the signal $I_{12}$ obtained through heterodyne reception does not includes noise, it is possible to calculate correct BFS. However, in the case where the noise is superimposed, a superimposed signal includes an inverted result. Therefore, BFS is calculated to be slightly smaller.

Figure 7:
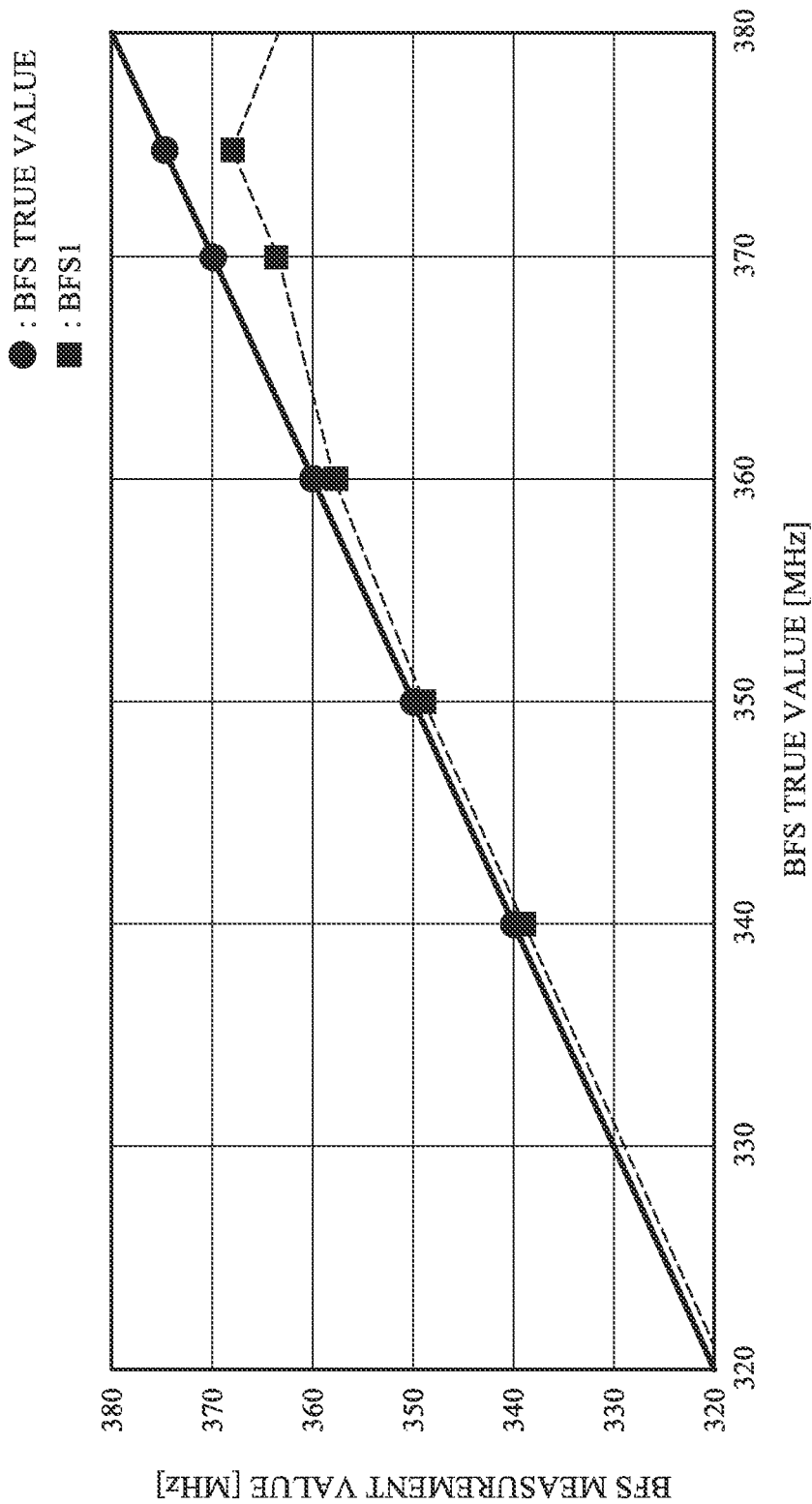
FIG. 7 is a diagram (part 2) illustrating a relation between BFS true values and BFS measurement values.

FIG. 7 is a diagram illustrating an example of a relation between BFS true values and BFS measurement values obtained in the case where a noise signal is superimposed. FIG. 7 illustrates a horizontal axis representing the BFS true values [MHz], and a vertical axis representing the BFS measurement values [MHz]. In this example, the BFS measurement value is inverted at 375 MHz.

In FIG. 7, circles represent the BFS true values, and squares represent the BFS1. As illustrated in FIG. 7, in the case where the BFS true value is approximately 375 MHz, measured BFS1 is slightly smaller than the BFS true value, and the linearity of the BFS1 is deteriorated. Accordingly, the synthesizer unit 80 of the measurement apparatus synthesizes a Brillouin frequency shift waveform by using BFS measurement values in a linear region.

The synthesizer unit 80 synthesizes a Brillouin frequency shift waveform from the selected BFS1, BFS2, and BFS3. Output of the synthesizer unit 80 and the signal intensity acquired by the signal intensity acquisition unit 91 are transmitted to the finiteness elimination unit 81.

The signal intensity acquisition unit 91 includes a squaring circuit 92, an LPF 94, and an inverse-squaring circuit 96, and achieves an envelope detection function for the beat signal which is output of the coherent detection unit 60. As a result, only intensity information of the beat signal is obtained when the beat signal passes through the squaring circuit 92, the LPF 94, and the inverse-squaring circuit 96 in this order. Note that, when the synthesizer unit 80 stores initial intensity information of a beat signal, $\delta P_B/P_B$ in the above-listed expression (1a) is obtained from the initial intensity information and newly measured intensity information. Note that, the configuration for obtaining $\delta P_B/P_B$ is not limited thereto. Any suitable configuration can be adopted.

Description of Process

Figure 8:
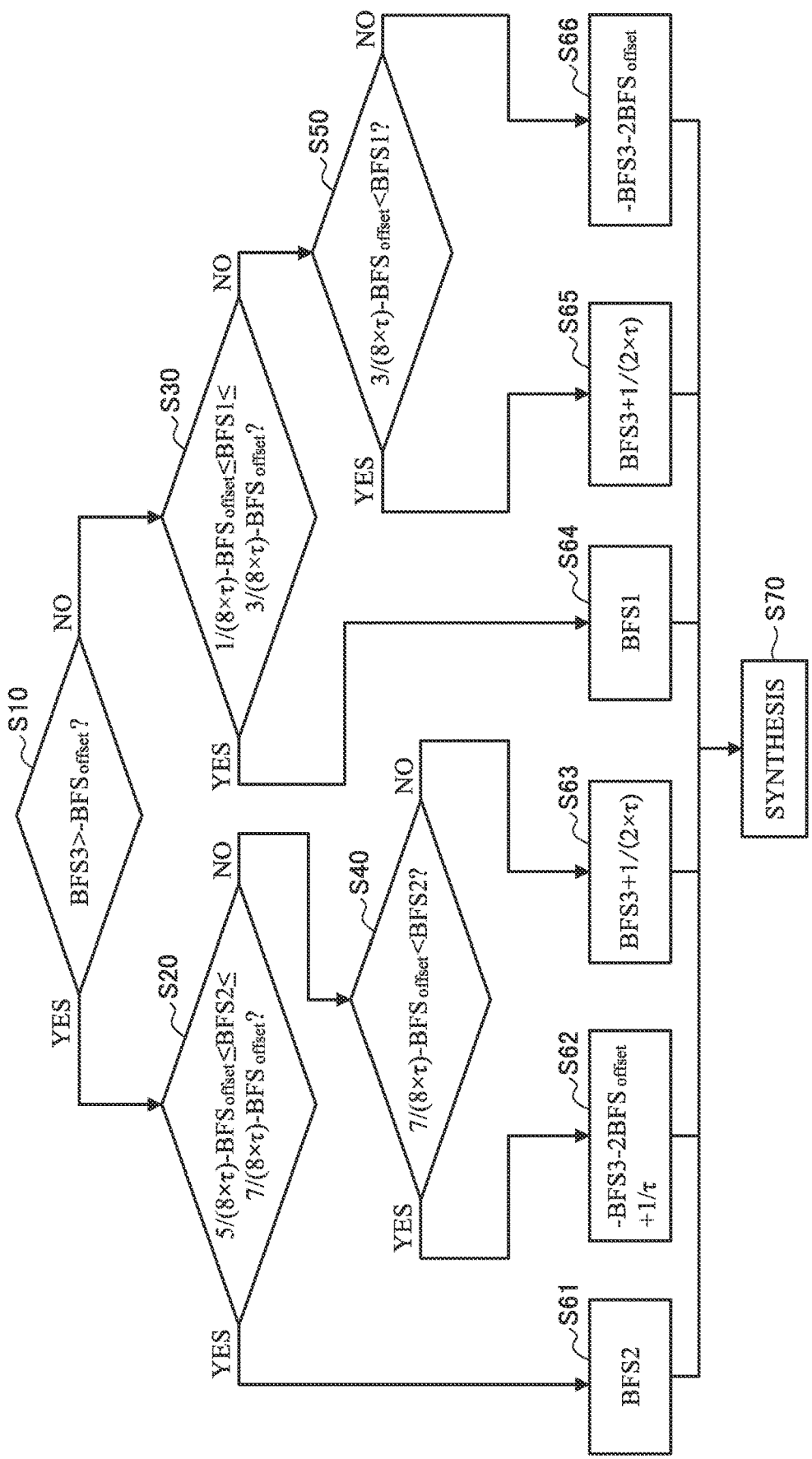
FIG. 8 is a diagram illustrating a processing flow of a synthesizer unit.

A process performed by the synthesizer unit 80 will be described with reference to FIG. 8. FIG. 8 is a diagram illustrating a processing flow of the synthesizer unit 80.

First, in a first determination step S10, it is determined whether or not $BFS3>-BFS_{offset}$ is satisfied. As illustrated in FIG. 6, BFS3 is larger than $-BFS_{offset}$ (−125 MHz in this example) in a region where the BFS1 is inverted. Therefore, it is determined whether or not the BFS1 is inverted on the basis of whether or not $BFS3>-BFS_{offset}$ is satisfied. The BFS1 is selected in a region where the BFS1 is not inverted and the BFS1 is linear. Alternatively, the BFS2 is selected in a region where the BFS1 is inverted and the BFS2 is linear.

Here, subsequent to the first determination step S10, it is determined whether or not the BFS1 and the BFS2 are linear.

In the case where a result of the first determination step S10 indicates that the condition is satisfied (Yes), that is, in the case where the BFS1 is inverted, it is determined whether or not $5/(8\times\tau)-BFS_{offset} \leq BFS2 \leq 7/(8\times\tau)-BFS_{offset}$ is satisfied in a second determination step S20, that is, it is determined whether or not it is a region where the BFS2 is linear. Here, the region where the BFS2 is linear is a range of 500 MHz to 750 MHz.

On the other hand, in the case where a result of the first determination step S10 indicates that the condition is not satisfied (No), that is, in the case where the BFS1 is not inverted, it is determined whether or not $1/(8\times\tau)-BFS_{offset} \leq BFS1 \leq 3/(8\lambda\tau)-BFS_{offset}$ is satisfied in a third determination step S30, that is, it is determined whether or not it is the region where the BFS1 is linear. Here, the region where the BFS1 is linear is a range of 0 MHz to 250 MHz.

The BFS3 is used in the case where results of the second determination step S20 and the third determination step S30 indicates that the conditions are not satisfied, that is, in the case where it is determined that the BFS1 and the BFS2 are not linear. The BFS3 is inverted in vicinities of $1/(4\times\tau)-BFS_{offset}$ and $3/(4\times\tau)-BFS_{offset}$, that is, in vicinities of 125 MHz and 625 MHz in this example. Therefore, the BFS3 has to be divided into cases including a case where $BFS3<1/(4\times\tau)-BFS_{offset}$ is satisfied, a case where $1/(4\times\tau)-BFS_{offset}<BFS3<3/(4\times\tau)-BFS_{offset}$ is satisfied, and a case where $BFS3<3/(4\times\tau)-BFS_{offset}$ is satisfied.

Therefore, in the case where a result of the second determination step S20 indicates that the condition is not satisfied (No), it is determined whether or not $7/(8\times\tau)-BFS_{offset}<BFS2$ is satisfied in a fourth determination step S40. In addition, in the case where a result of the third determination step S30 indicates that the condition is not satisfied (No), it is determined whether or not $3/(8\times\tau)-BFS_{offset}<BFS1$ is satisfied in a fifth determination step S50.

The BFS2 is selected (Step S61) in the case where a result of the second determination step S20 indicates that the condition is satisfied (Yes).

In the case where a result of the fourth determination step S40 indicates that the condition is satisfied (Yes), the BFS3 that is inverted on the basis of $BFS_{offset}$ and on which a $1/\tau$ offset is superimposed, that is, $-BFS3-2\times BFS_{offset}+1/\tau$ is selected (Step S62).

In the case where a result of the fourth determination step S40 indicates that the condition is not satisfied (No), the BFS3 on which $1/(2\times\tau)$ is superimposed, that is, $BFS3+1/(2\times\tau)$ is selected (Step S63).

The BFS1 is selected (Step S64) in the case where a result of the third determination step S30 indicates that the condition is satisfied (Yes).

In the case where a result of the fifth determination step S50 indicates that the condition is satisfied (Yes), the BFS3 on which $1/(2\times\tau)$ is superimposed, that is, $BFS3+1/(2\times\tau)$ is selected (Step S65).

In the case where a result of the fifth determination step S50 indicates that the condition is not satisfied (No), the BFS3 inverted on the basis of $BFS_{offset}$, that is, $-BFS3-2\times_{offset}$ is selected (Step S66).

In a synthesis step S70, the synthesizer unit 80 synthesizes a BFS waveform from the BFSs selected in Steps S61 to S66. In other words, the synthesizer unit 80 synthesizes $-BFS3-2\times BFS_{offset}$ as the BFS waveform when $BFS1<1/(8\times\tau)-BFS_{offset}$ is satisfied. The synthesizer unit 80 synthesizes BFS1 as the BFS waveform when $1/(8\times\tau)-BFS_{offset} \leq BFS1 \leq 3/(8\times\tau)-BFS_{offset}$ is satisfied. The synthesizer unit 80 synthesizes $BFS3+1/(2\times\tau)$ as the BFS waveform when $3/(8\times\tau)-BFS_{offset}<BFS1$ and $BFS2<5/(8\times\tau)-BFS_{offset}$ are satisfied. The synthesizer unit 80 synthesizes BFS2 as the BFS waveform when $5/(8\times\tau)-BFS_{offset} \leq BFS2 \leq 7/(8\times\tau)-BFS_{offset}$ is satisfied. The synthesizer unit 80 synthesizes $-BFS3-2\times BFS_{offset}+1/\tau$ as the BFS waveform when $7/(8\times\tau)-BFS_{offset}<BFS2$ is satisfied.

Figure 9:
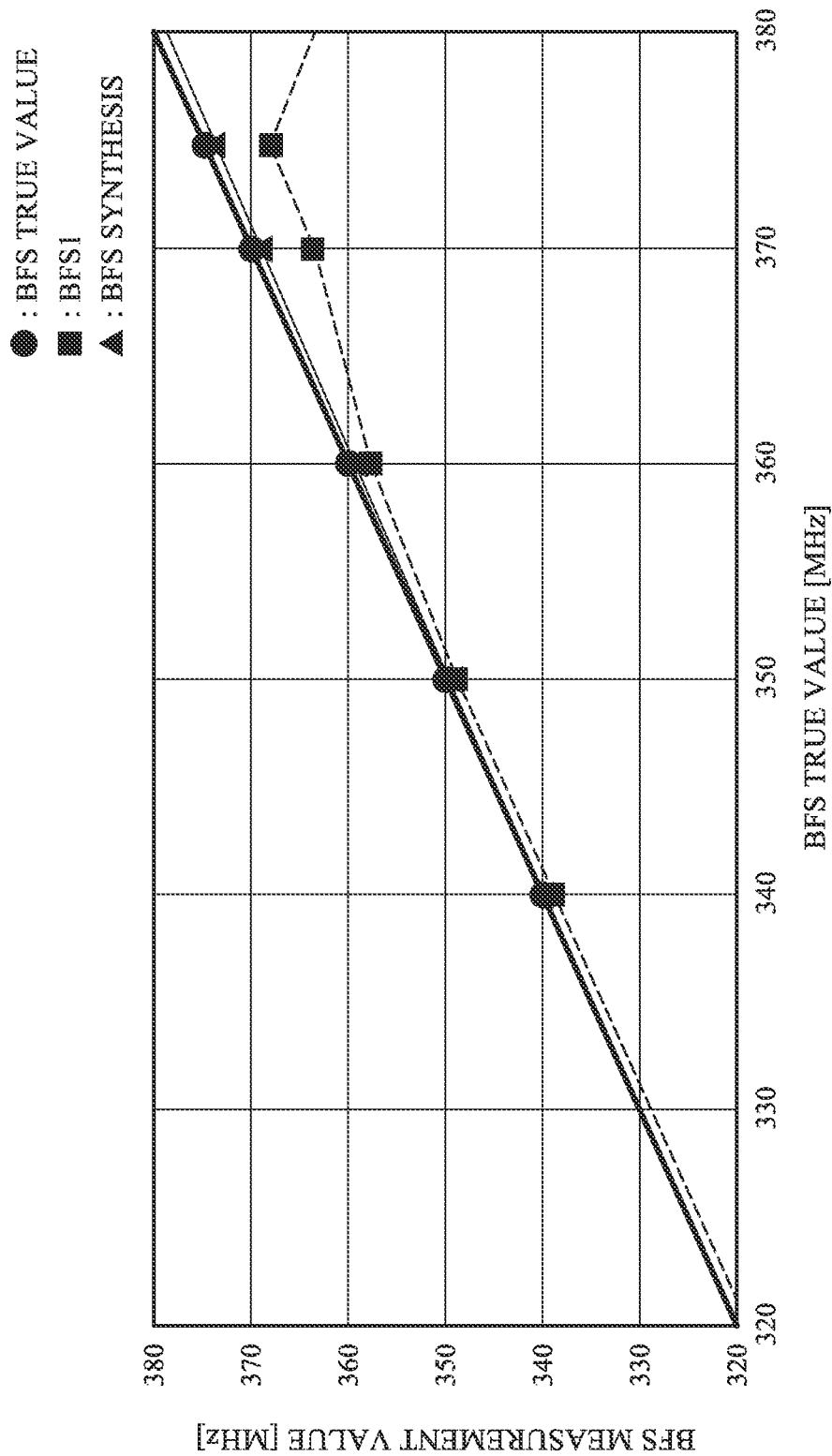
FIG. 9 is a diagram (part 3) illustrating a relation between BFS true values and BFS measurement values.

FIG. 9 is a diagram illustrating an example of a relation between BFS true values and BFS measurement values obtained in the case where a noise signal is superimposed. FIG. 8 illustrates a horizontal axis representing the BFS true values [MHz], and a vertical axis representing the BFS measurement values [MHz]. In this example, the BFS measurement value is inverted at 375 MHz. In FIG. 9, circles represent the BFS true values, squares represent the BFS1, and triangles represent BFS synthesized by the synthesizer unit 80 (BFS synthesis). As illustrated in FIG. 9, the BFS synthesized by the synthesizer unit 80 has values that are closer to the BFS true values, and this means that the linearity is maintained.

Figure 10:
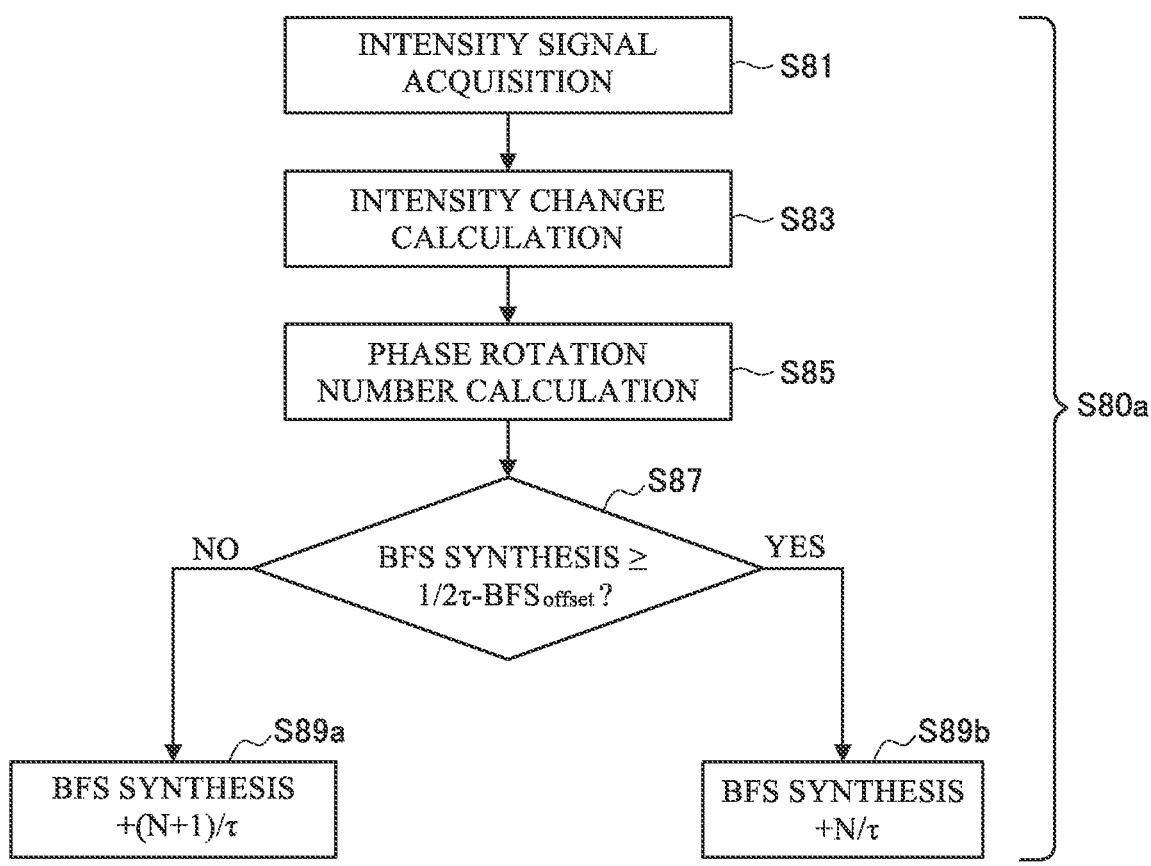
FIG. 10 is a diagram illustrating a processing flow of a finiteness elimination unit.

Subsequent to the synthesis step S70, a finiteness elimination step is performed. A finiteness elimination step S80a will be described with reference to FIG. 10. FIG. 10 is a diagram illustrating a processing flow of a finiteness elimination step according to an embodiment.

The finiteness elimination step S80a is a process of eliminating effects caused by a measured BFS rotating every $2\pi$ phase variation. For example, the finiteness elimination step S80a includes an intensity signal acquisition step S81, an intensity change calculation step S83, a phase rotation number calculation step S85, a BFS selection step S87, and a BFS decision step S89 that are performed in this order.

In the intensity signal acquisition step S81, the finiteness elimination unit 81 acquires signal intensity from an intensity information acquisition unit 91. Note that, the finiteness elimination unit 81 can store signal intensity without any strain in any suitable storage unit as an initial value. The signal intensity without any strain is obtained when installing an optical fiber, for example. It is preferable to also store temperature of the optical fiber measured when the initial value is obtained, and temperature of an environment where the optical fiber is installed.

In the intensity change calculation step S83, the finiteness elimination unit 81 calculates intensity change $P_{change}(\%)$ by using signal intensity that is acquired from the intensity information acquisition unit 91 and the initial value of the intensity signal that is stored in advance.

In the phase rotation number calculation step S85, the finiteness elimination unit 81 calculates a phase rotation number N by using the intensity change $P_{change}(\%)$ calculated in the intensity change calculation step S83. In the phase rotation number calculation step S85, expressions (13a) and (13b) listed below are used.

$$\left(\frac{1}{2\tau} - BFS_{offset} + \frac{N}{\tau}\right) \times \frac{C_{PT}}{C_{\nu T}} \leq \quad (13a)$$

$$P_{change} \leq \left(\frac{1}{2\tau} - BFS_{offset} + \frac{N+1}{\tau}\right) \times \frac{C_{PT}}{C_{\nu T}}$$

$$\left(\frac{1}{2\tau} - BFS_{offset} + \frac{N}{\tau}\right) \times \frac{C_{P\varepsilon}}{C_{\nu\varepsilon}} \leq \quad (13b)$$

$$P_{change} \leq \left(\frac{1}{2\tau} - BFS_{offset} + \frac{N+1}{\tau}\right) \times \frac{C_{P\varepsilon}}{C_{\nu\varepsilon}}$$

The expression (13a) listed above is used in the case where no tensile stress or the like is applied to the optical fiber and the optical fiber is not strained. On the other hand, the expression (13b) listed above is used in the case where the temperature of the optical fiber is not changed.

In the BFS selection step S87, it is determined whether or not the BFS obtained in the step S70 (BFS synthesis) is equal to or greater than $\frac{1}{2}\tau - BFS_{offset}$. In the case where the BFS synthesis is equal to or greater than $\frac{1}{2}\tau - BFS_{offset}$ (Yes), N/τ is given to the BFS synthesis as an offset, and the BFS synthesis +N/τ is decided as a measurement result (Step S89a). On the other hand, in the case where a result of the BFS selection step S87 indicates that the BFS synthesis obtained in the step S70 is less than $\frac{1}{2}\tau - BFS_{offset}$ (No), (N+1)/τ is given to the BFS synthesis as an offset, and the BFS synthesis+(N+1)/τ is decided as a measurement result (Step S85b).

In this specification, the example in which the settings are configured in such a manner that the phase of the BFS synthesis is rotated around the center of a range of a BFS given by a certain phase rotation number N has been described. However, the present invention is not limited thereto. For example, settings may be configured in such a manner that the phase of the BFS synthesis is rotated at a boundary of the range of the BFS given by the certain phase rotation number N.

Figure 11A:
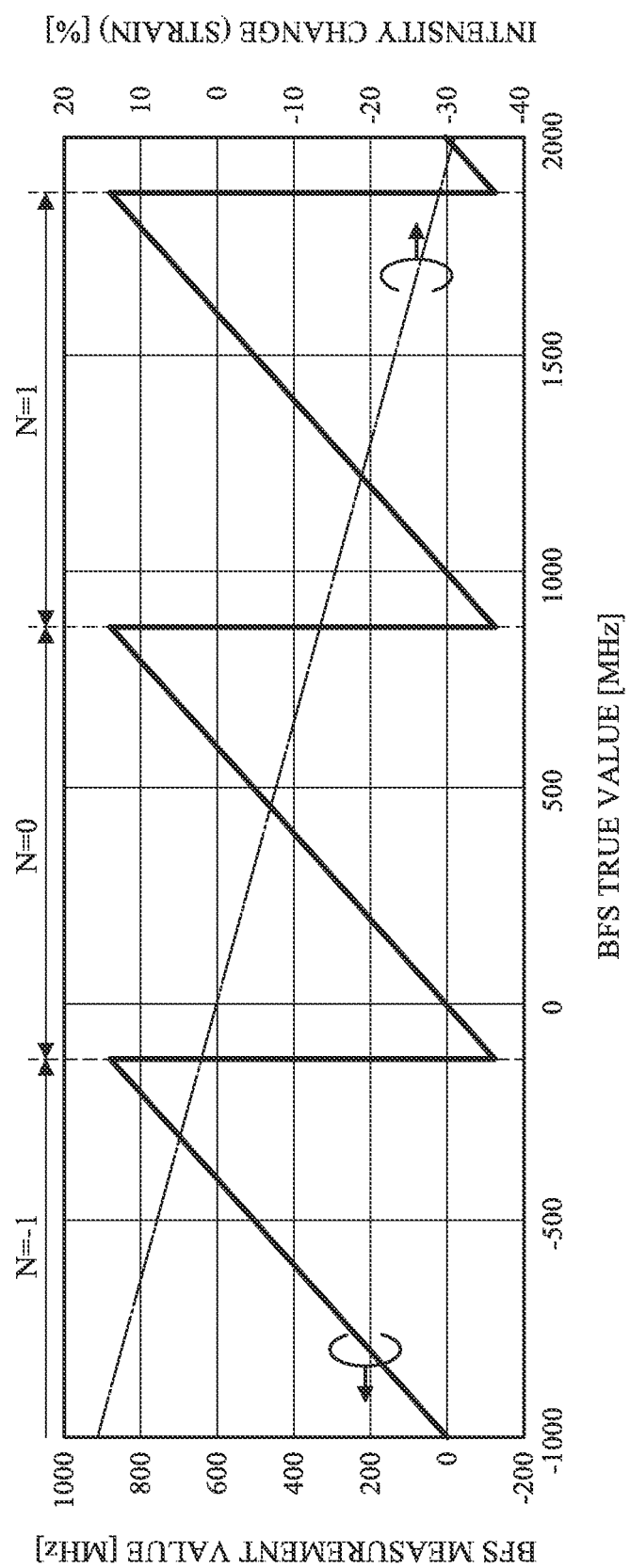
FIG. 11A is a schematic diagram for describing another embodiment.
Figure 11B:
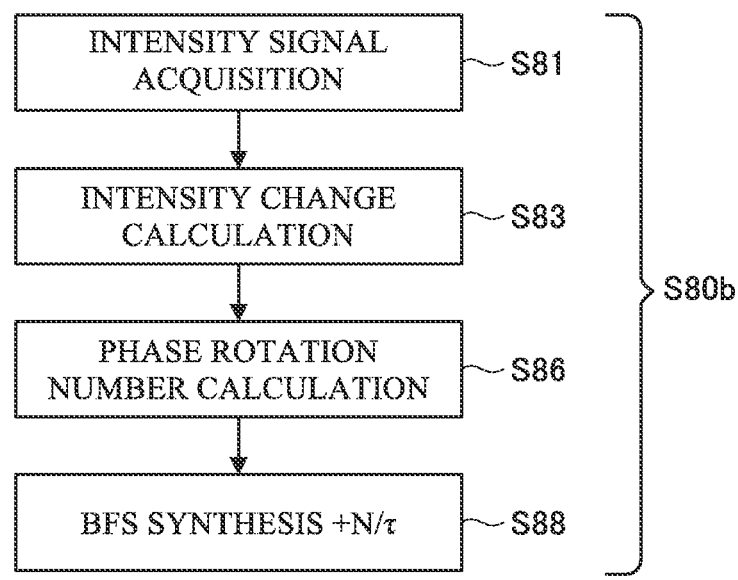
FIG. 11B is a schematic diagram for describing the other embodiment.

With reference to FIG. 11A and FIG. 11B, an example according to another embodiment will be described. In this example, the phase of BFS synthesis is rotated at a boundary of a range of BFS given by a certain phase rotation number N. According to the other embodiment, the range of BFS given by the certain phase rotation number N is set as illustrated in FIG. 11A. In addition, FIG. 11B is a diagram illustrating a processing flow of a finiteness elimination step according to the other embodiment. In FIG. 1, the phase is rotated at the center of the region decided by the phase rotation number N. However, FIG. 11A is different from FIG. 1 in that the phase is rotated at both ends of the region decided by the phase rotation number N in FIG. 11A. Except for the above, FIG. 11A is similar to FIG. 1. Therefore, repeated explanation thereof will be omitted.

The finiteness elimination step S80b is a process of eliminating effects caused by a measured BFS rotating every $2\pi$ phase variation. For example, the finiteness elimination step includes an intensity signal acquisition step S81, an intensity change calculation step S83, a phase rotation number calculation step S86, and a BFS decision step S88 that are performed in this order.

The intensity signal acquisition step S81 and the intensity change calculation step S83 are similar to those according to the embodiment described with reference to FIG. 10. Accordingly, repeated description thereof is omitted.

In the phase rotation number calculation step S86, the finiteness elimination unit 81 calculates a phase rotation number N by using the intensity change $P_{change}(\%)$ calculated in the intensity change calculation step S83. In the phase rotation number calculation step S85, expressions (14a) and (14b) listed below are used.

$$\left(\frac{1}{\tau} - BFS_{offset} + \frac{N}{\tau}\right) \times \frac{C_{PT}}{C_{\nu T}} \leq \quad (14a)$$

$$P_{change} \leq \left(\frac{1}{\tau} - BFS_{offset} + \frac{N+1}{\tau}\right) \times \frac{C_{PT}}{C_{\nu T}}$$

$$\left(\frac{1}{\tau} - BFS_{offset} + \frac{N}{\tau}\right) \times \frac{C_{P\varepsilon}}{C_{\nu\varepsilon}} \leq \quad (14b)$$

$$P_{change} \leq \left(\frac{1}{\tau} - BFS_{offset} + \frac{N+1}{\tau}\right) \times \frac{C_{P\varepsilon}}{C_{\nu\varepsilon}}$$

The expression (14a) listed above is used in the case where no tensile stress or the like is applied to the optical fiber. On the other hand, the expression (14b) listed above is used in the case where the temperature of the optical fiber is not changed.

In the BFS decision step S88, N/τ is given to BFS synthesis as an offset, and the BFS synthesis +N/τ is decided as a measurement result (Step S88).

After a waveform of the decided BFS is obtained, temperature or strain of the measurement target optical fiber 100 are acquired. The temperature and strain can be acquired from the BFS waveform by using any suitable conventionally well-known ways. Therefore, details thereof is omitted here.

The measurement apparatus acquires BFSs from three values obtained from the first and second FBS calculation units, acquires a phase rotation number N on the basis of change in signal intensity, and decides a BFS by using the acquired BFSs and phase rotation number N. As a result, in the case where the optical fiber is not strained, or in a case where the temperature of the optical fiber is not changed, it is possible to eliminate finiteness with regard to a measurement range of 1 to 1000 MHz corresponding to conventional finite phase shift of 0 to $2\pi$, and expand the measurement range.

Note that, in the present specification, the linearity of the BFS (BFS synthesis) synthesized by the synthesizer unit 80 is maintained. However, a main object of the present invention is to expand the measurement range. Therefore, in the case where strict linearity is not required, the synthesizer unit 80 may determine whether or not the BFS1 is inverted by using the BFS3, may synthesize the BFS by using the BFS1 in a region where the BFS1 is not inverted or by using the BFS2 in a region where the BFS1 is inverted, and may achieve the BFS synthesis. Although details of the preferable embodiments of the present invention have been described above with reference to the appended drawings, the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

What is claimed is:

1. An optical fiber strain and temperature measurement apparatus comprising:
   a light source unit configured to generate probe light;
   a splitting unit configured to split Brillouin backscattered light generated from the probe light through an optical fiber serving as a measurement target, into two branches including a first light path and a second light path;
   an optical frequency shifter unit provided in any one of the first light path and the second light path and configured to give a frequency shift of a beat frequency;
   a delay unit provided in any one of the first light path and the second light path and configured to delay propagating light by delay time $\tau$;
   a multiplexer unit configured to multiplex light propagating through the first light path and the second light path to generate multiplexed light;
   a coherent detection unit configured to perform heterodyne detection on the multiplexed light to output a difference frequency as a measurement signal;
   an electrical signal generating unit configured to generate a local oscillation signal having a same frequency as a frequency of the measurement signal; and
   a Brillouin frequency shift acquisition unit configured to perform homodyne detection on the measurement signal and the local oscillation signal to acquire a phase difference between the measurement signal and the local oscillation signal and a frequency shift amount based on intensity of the measurement signal,
   wherein the Brillouin frequency shift acquisition unit includes a first Brillouin frequency shift calculation unit, a second Brillouin frequency shift calculation unit, a synthesizer unit, a 90-degree phase shift unit, and a finiteness elimination unit,
   the measurement signal transmitted to the Brillouin frequency shift acquisition unit is split into two branches, one of split measurement signals is referred to as a first measurement signal and is transmitted to the first Brillouin frequency shift calculation unit, the other of the split measurement signals is referred to as a second measurement signal and is transmitted to the second Brillouin frequency shift calculation unit,
   the local oscillation signal transmitted to the Brillouin frequency shift acquisition unit is split into two branches, one of split local oscillation signals is referred to as a first local oscillation signal and is transmitted to the first Brillouin frequency shift calculation unit, the other of the split local oscillation signals is referred to as a second local oscillation signal, is subjected to 90-degree phase shift in the 90-degree phase shift unit, and then is transmitted to the second Brillouin frequency shift calculation unit,
   the first Brillouin frequency shift calculation unit acquires a first Brillouin frequency shift BFS1 and a second Brillouin frequency shift BFS2, which is obtained by inverting the first Brillouin frequency shift, on a basis of the first measurement signal and the first local oscillation signal,
   the second Brillouin frequency shift calculation unit acquires a third Brillouin frequency shift BFS3 on a basis of the second measurement signal and the second local oscillation signal,
   the synthesizer unit synthesizes a Brillouin frequency shift waveform from the first to third Brillouin frequency shifts BFS1 to BFS3, and
   in a case where the optical fiber is not strained or in a case where temperature of the optical fiber is not changed, the finiteness elimination unit calculates a phase rotation number N, which is a phase difference between the measurement signal and the local oscillation signal, on a basis of the intensity of the measurement signal, and gives an offset corresponding to the phase rotation number N to the synthesized Brillouin frequency shift waveform.

2. The optical fiber strain and temperature measurement apparatus according to claim 1, wherein
   the synthesizer unit synthesizes $-BFS3-2\times BFS_{offset}$ as the Brillouin frequency shift waveform when $BFS1<1/(8\times\tau)-BFS_{offset}$ is satisfied with regard to a Brillouin frequency shift offset amount $BFS_{offset}$,
   the synthesizer unit synthesizes BFS1 as the Brillouin frequency shift waveform when $1/(8\times\tau)-BFS_{offset} \leq BFS1 \leq 3/(8\times\tau)-BFS_{offset}$ is satisfied with regard to the Brillouin frequency shift offset amount $BFS_{offset}$,
   the synthesizer unit synthesizes $BFS3+1/(2\times\tau)$ as the Brillouin frequency shift waveform when $3/(8\times\tau)-BFS_{offset}<BFS1$ and $BFS2<5/(8\times\tau)-BFS_{offset}$ are satisfied with regard to the Brillouin frequency shift offset amount $BFS_{offset}$,
   the synthesizer unit synthesizes BFS2 as the Brillouin frequency shift waveform when $5/(8\times\tau)-BFS_{offset} \leq BFS2 \leq 7/(8\times\tau)-BFS_{offset}$ is satisfied with regard to the Brillouin frequency shift offset amount $BFS_{offset}$, and
   the synthesizer unit synthesizes $-BFS3-2\times BFS_{offset}+1/\tau$ as the Brillouin frequency shift waveform when $7/(8\times\tau)-BFS_{offset}<BFS2$ is satisfied with regard to the Brillouin frequency shift offset amount $BFS_{offset}$.

3. The optical fiber strain and temperature measurement apparatus according to claim 1, wherein,
the finiteness elimination unit calculates the phase rotation number N from intensity change $P_{change}(\%)$ in the measurement signal by using $$\left(\frac{1}{2\tau} - BFS_{offset} + \frac{N}{\tau}\right) \times \frac{C_{PT}}{C_{vT}} \leq P_{change} \leq \left(\frac{1}{2\tau} - BFS_{offset} + \frac{N+1}{\tau}\right) \times \frac{C_{PT}}{C_{vT}}$$

with regard to the Brillouin frequency shift offset amount $BFS_{offset}$ in a case where the optical fiber is not strained, or by using $$\left(\frac{1}{2\tau} - BFS_{offset} + \frac{N}{\tau}\right) \times \frac{C_{P\varepsilon}}{C_{v\varepsilon}} \leq P_{change} \leq \left(\frac{1}{2\tau} - BFS_{offset} + \frac{N+1}{\tau}\right) \times \frac{C_{P\varepsilon}}{C_{v\varepsilon}}$$

with regard to the Brillouin frequency shift offset amount $BFS_{offset}$ in a case where the temperature of the optical fiber is not changed, and
the finiteness elimination unit gives N/τ as the offset in a case where the synthesized Brillouin frequency shift waveform is equal to or greater than ½τ-$BFS_{offset}$, or gives (N+1)/τ as the offset in a case where the synthesized Brillouin frequency shift waveform is less than ½τ-$BFS_{offset}$.

4. The optical fiber strain and temperature measurement apparatus according to claim 1, wherein
the finiteness elimination unit calculates the phase rotation number N from intensity change $P_{change}(\%)$ in the measurement signal by using $$\left(\frac{1}{\tau} - BFS_{offset} + \frac{N}{\tau}\right) \times \frac{C_{PT}}{C_{vT}} \leq P_{change} \leq \left(\frac{1}{\tau} - BFS_{offset} + \frac{N+1}{\tau}\right) \times \frac{C_{PT}}{C_{vT}}$$

in a case where the optical fiber is not strained, or by using $$\left(\frac{1}{\tau} - BFS_{offset} + \frac{N}{\tau}\right) \times \frac{C_{P\varepsilon}}{C_{v\varepsilon}} \leq P_{change} \leq \left(\frac{1}{\tau} - BFS_{offset} + \frac{N+1}{\tau}\right) \times \frac{C_{P\varepsilon}}{C_{v\varepsilon}}$$

in a case where the temperature of the optical fiber is not changed, and
the finiteness elimination unit gives N/τ to the synthesized Brillouin frequency shift waveform as the offset.

5. An optical fiber strain and temperature measurement method comprising:
a step of generating probe light;
a step of splitting Brillouin backscattered light generated from the probe light through an optical fiber serving as a measurement target, into two branches including a first light path and a second light path;
a step of giving a frequency shift of a beat frequency to light propagating through any one of the first light path and the second light path;
a step of delaying light propagating through any one of the first light path and the second light path, by delay time τ;
a step of multiplexing light propagating through the first light path and the second light path to generate multiplexed light;
a step of performing heterodyne detection on the multiplexed light to output a difference frequency as a measurement signal;
a step of generating a local oscillation signal having a same frequency as a frequency of the measurement signal; and
a step of performing homodyne detection on the measurement signal and the local oscillation signal to acquire a frequency shift amount,
wherein the step of acquiring of the frequency shift amount includes
a step of splitting the measurement signal into two signals including a first measurement signal and a second measurement signal,
a step of splitting the local oscillation signal into two signals including a first local oscillation signal and a second local oscillation signal,
a step of acquiring a first Brillouin frequency shift BFS1 and a second Brillouin frequency shift BFS2, which is obtained by inverting the first Brillouin frequency shift, on a basis of the first measurement signal and the first local oscillation signal,
a step of acquiring a third Brillouin frequency shift BFS3 on a basis of the second measurement signal and the second local oscillation signal after subjecting the second local oscillation signal to 90-degree phase shift,
a step of synthesizing a Brillouin frequency shift waveform from the first to third Brillouin frequency shifts BFS1 to BFS3, and
a step of calculating a phase rotation number N, which is a phase difference between the measurement signal and the local oscillation signal, on a basis of intensity of the measurement signal and giving an offset corresponding to the phase rotation number N to the synthesized Brillouin frequency shift waveform in a case where the optical fiber is not strained or in a case where temperature of the optical fiber is not changed.

6. The optical fiber strain and temperature measurement method according to claim 5, wherein,
in the step of synthesizing the Brillouin frequency shift waveform,
−BFS3−2×$BFS_{offset}$ is synthesized as the Brillouin frequency shift waveform when BFS1<1/(8×τ)−$BFS_{offset}$ is satisfied with regard to a Brillouin frequency shift offset amount $BFS_{offset}$,
BFS1 is synthesized as the Brillouin frequency shift waveform when 1/(8×τ)−$BFS_{offset}$≤BFS1≤3/(8×τ)−$BFS_{offset}$ is satisfied with regard to the Brillouin frequency shift offset amount $BFS_{offset}$,
BFS3+1/(2×τ) is synthesized as the Brillouin frequency shift waveform when 3/(8×τ)−$BFS_{offset}$<BFS1 and BFS2<5/(8×τ)−$BFS_{offset}$ are satisfied with regard to the Brillouin frequency shift offset amount $BFS_{offset}$,
BFS2 is synthesized as the Brillouin frequency shift waveform when 5/(8×τ)−$BFS_{offset}$≤BFS2≤7/(8×τ)−$BFS_{offset}$ is satisfied with regard to the Brillouin frequency shift offset amount $BFS_{offset}$, and
−BFS3−2×$BFS_{offset}$+1/(8×τ) is synthesized as the Brillouin frequency shift waveform when 7/(8×τ)−$BFS_{offset}$<BFS2 is satisfied with regard to the Brillouin frequency shift offset amount $BFS_{offset}$.

7. The optical fiber strain and temperature measurement method according to claim 6,
wherein the step of synthesizing the Brillouin frequency shift waveform includes
a first determination step of determining whether or not BFS3>−$BFS_{offset}$ is satisfied,
a second determination step of determining whether or not 5/(8×τ)−$BFS_{offset}$≤BFS2≤7/(8×τ)−$BFS_{offset}$ is satisfied, the second determination step being performed in a case where a result of the first determination step indicates that BFS3>−BFS$_{offset}$ is satisfied, a third determination step of determining whether or not 1/(8×τ)−BFS$_{offset}$≤BFS1≤3/(8×τ)−BFS$_{offset}$ is satisfied, the third determination step being performed in a case where a result of the first determination step indicates that BFS3>−BFS$_{offset}$ is not satisfied, a fourth determination step of determining whether or not 7/(8×τ)−BFS$_{offset}$<BFS2 is satisfied, the fourth determination step being performed in a case where a result of the second determination step indicates that 5/(8×τ)−BFS$_{offset}$≤BFS2≤7/(8×τ)−BFS$_{offset}$ is not satisfied, a fifth determination step of determining whether or not 3/(8×τ)−BFS$_{offset}$<BFS1 is satisfied, the fifth determination step being performed in a case where a result of the third determination step indicates that 1/(8×τ)−BFS$_{offset}$≤BFS1≤3/(8×τ)−BFS$_{offset}$ is not satisfied, and a step of synthesizing BFS2 as the Brillouin frequency shift waveform in a case where a result of the second determination step indicates that 5/(8×τ)−BFS$_{offset}$≤BFS2≤7/(8×τ)−BFS$_{offset}$ is satisfied, synthesizing −BFS3−2×BFS$_{offset}$+1/τ as the Brillouin frequency shift waveform in a case where a result of the fourth determination step indicates that 7/(8×τ)−BFS$_{offset}$<BFS2 is satisfied, synthesizing BFS3+1/(2×τ) as the Brillouin frequency shift waveform in a case where a result of the fourth determination step indicates that 7/(8×τ)−BFS$_{offset}$<BFS2 is not satisfied, synthesizing BFS1 as the Brillouin frequency shift waveform in a case where a result of the third determination step indicates that 1/(8×τ)−BFS$_{offset}$≤BFS1≤3/(8×τ)−BFS$_{offset}$ is satisfied, synthesizing BFS3+1/(2×τ) as the Brillouin frequency shift waveform in a case where a result of the fifth determination step indicates that 3/(8×τ)−BFS$_{offset}$<BFS1 is satisfied, or synthesizing −BFS3−2×BFS$_{offset}$ as the Brillouin frequency shift waveform in a case where a result of the fifth determination step indicates that 3/(8×τ)−BFS$_{offset}$<BFS1 is not satisfied.

8. The optical fiber strain and temperature measurement method according to claim 5,
wherein the step of giving the offset to the synthesized Brillouin frequency shift waveform includes
a step of acquiring signal intensity of the measurement signal with regard to a Brillouin frequency shift offset amount BFS$_{offset}$,
a step of calculating intensity change P$_{change}$(%) by using the acquired signal intensity and an initial value of the signal intensity that is stored in advance,
a step of calculating the phase rotation number N from the intensity change P$_{change}$(%) in the measurement signal by using $$\left(\frac{1}{2\tau} - BFS_{offset} + \frac{N}{\tau}\right) \times \frac{C_{PT}}{C_{vT}} \le P_{change} \le \left(\frac{1}{2\tau} - BFS_{offset} + \frac{N+1}{\tau}\right) \times \frac{C_{PT}}{C_{vT}}$$

in a case where the optical fiber is not strained, or by using $$\left(\frac{1}{2\tau} - BFS_{offset} + \frac{N}{\tau}\right) \times \frac{C_{P\varepsilon}}{C_{v\varepsilon}} \le P_{change} \le \left(\frac{1}{2\tau} - BFS_{offset} + \frac{N+1}{\tau}\right) \times \frac{C_{P\varepsilon}}{C_{v\varepsilon}}$$

in a case where the temperature of the optical fiber is not changed, and
a step of giving Nit as the offset in a case where the synthesized Brillouin frequency shift waveform is equal to or greater than ½τ−BFS$_{offset}$, or giving (N+1)/τ as the offset in a case where the synthesized Brillouin frequency shift waveform is less than ½τ−BFS$_{offset}$.

9. The optical fiber strain and temperature measurement method according to claim 5,
wherein the step of giving the offset to the synthesized Brillouin frequency shift waveform includes
a step of acquiring signal intensity of the measurement signal,
a step of calculating intensity change P$_{change}$(%) by using the acquired signal intensity and an initial value of the signal intensity that is stored in advance,
a step of calculating the phase rotation number N from the intensity change P$_{change}$(%) in the measurement signal by using $$\left(\frac{1}{\tau} - BFS_{offset} + \frac{N}{\tau}\right) \times \frac{C_{PT}}{C_{vT}} \le P_{change} \le \left(\frac{1}{\tau} - BFS_{offset} + \frac{N+1}{\tau}\right) \times \frac{C_{PT}}{C_{vT}}$$

in a case where the optical fiber is not strained, or by using $$\left(\frac{1}{\tau} - BFS_{offset} + \frac{N}{\tau}\right) \times \frac{C_{P\varepsilon}}{C_{v\varepsilon}} \le P_{change} \le \left(\frac{1}{\tau} - BFS_{offset} + \frac{N+1}{\tau}\right) \times \frac{C_{P\varepsilon}}{C_{v\varepsilon}}$$

in a case where the temperature of the optical fiber is not changed, and
a step of giving NIT to the synthesized Brillouin frequency shift waveform as the offset.

* * * * *